(12) United States Patent
Rodie et al.

(10) Patent No.: US 12,513,202 B2
(45) Date of Patent: Dec. 30, 2025

(54) DATA CAPTURE, DISSEMINATION AND ENHANCED VISUAL OVERLAY

(71) Applicant: Atrium Sports, Inc., New York, NY (US)

(72) Inventors: Warren Rodie, New York, NY (US); Bruce Irvine, New York, NY (US); Gavin Smith, New York, NY (US)

(73) Assignee: Atrium Sports, Inc., New York, NY (US)

(*) Notice: Subject to any disclaimer, the term of this patent is extended or adjusted under 35 U.S.C. 154(b) by 0 days.

(21) Appl. No.: 17/219,436

(22) Filed: Mar. 31, 2021

(65) Prior Publication Data
US 2021/0306391 A1   Sep. 30, 2021

Related U.S. Application Data

(60) Provisional application No. 63/002,765, filed on Mar. 31, 2020.

(51) Int. Cl.
*H04L 65/402* (2022.01)
*G06Q 10/109* (2023.01)
*H04L 65/60* (2022.01)

(52) U.S. Cl.
CPC ....... *H04L 65/4025* (2022.05); *G06Q 10/109* (2013.01); *H04L 65/60* (2013.01)

(58) Field of Classification Search
CPC .... H04L 65/4023; H04L 65/60; G06Q 10/109
USPC .......................................................... 709/217
See application file for complete search history.

(56) References Cited

U.S. PATENT DOCUMENTS

| | | | |
|---|---|---|---|
| 6,536,041 B1* | 3/2003 | Knudson .............. | H04N 21/435 725/50 |
| 2009/0029754 A1* | 1/2009 | Slocum ............. | A63B 24/0087 463/32 |
| 2010/0226428 A1* | 9/2010 | Thevathasan ......... | H04L 65/765 375/E7.026 |
| 2015/0297949 A1* | 10/2015 | Aman .................... | G06T 7/246 348/157 |
| 2017/0006322 A1* | 1/2017 | Dury .................... | H04N 21/254 |
| 2017/0064400 A1* | 3/2017 | Riegel ................ | H04N 21/2743 |
| 2019/0182554 A1* | 6/2019 | Schupak ............ | H04N 21/4788 |

* cited by examiner

*Primary Examiner* — Nicholas R Taylor
(74) *Attorney, Agent, or Firm* — Richard T. Black; FisherBroyles, LLP

(57) ABSTRACT

A system includes one or more computing devices communicatively coupled to one or more sports content sources. The one or more computing devices are further coupled to multiple sports-content outlet entities. The one or more computing devices are configured to provide sports content from the one or more sources to the outlet entities.

14 Claims, 2 Drawing Sheets

DATA CAPTURE, DISSEMINATION AND ENHANCED VISUAL OVERLAY

PRIORITY CLAIM

This application claims priority to U.S. Prov. Pat. Appl. No. 63/002,765 filed Mar. 31, 2020, the contents of which are hereby incorporated by reference as if fully set forth herein.

BACKGROUND

Previously, a sports information product was required to maintain its own schedule, and if something changed (e.g., time of match, team name, player name), then each product would need to be updated. Such approaches have failed because each requires either manual intervention to make each change, or requires integration work to multiple technologies. Additionally, traditional broadcast graphics utilize a complex combination of software and hardware that is typically managed/driven by personnel at the location of a match/event. Traditional hardware- and software-based solutions requiring onsite personnel have proved to be cost prohibitive for all but the largest sporting organizations. The training and human capital required to be successful is also a barrier.

DRAWING FIGURES

Figure 1:
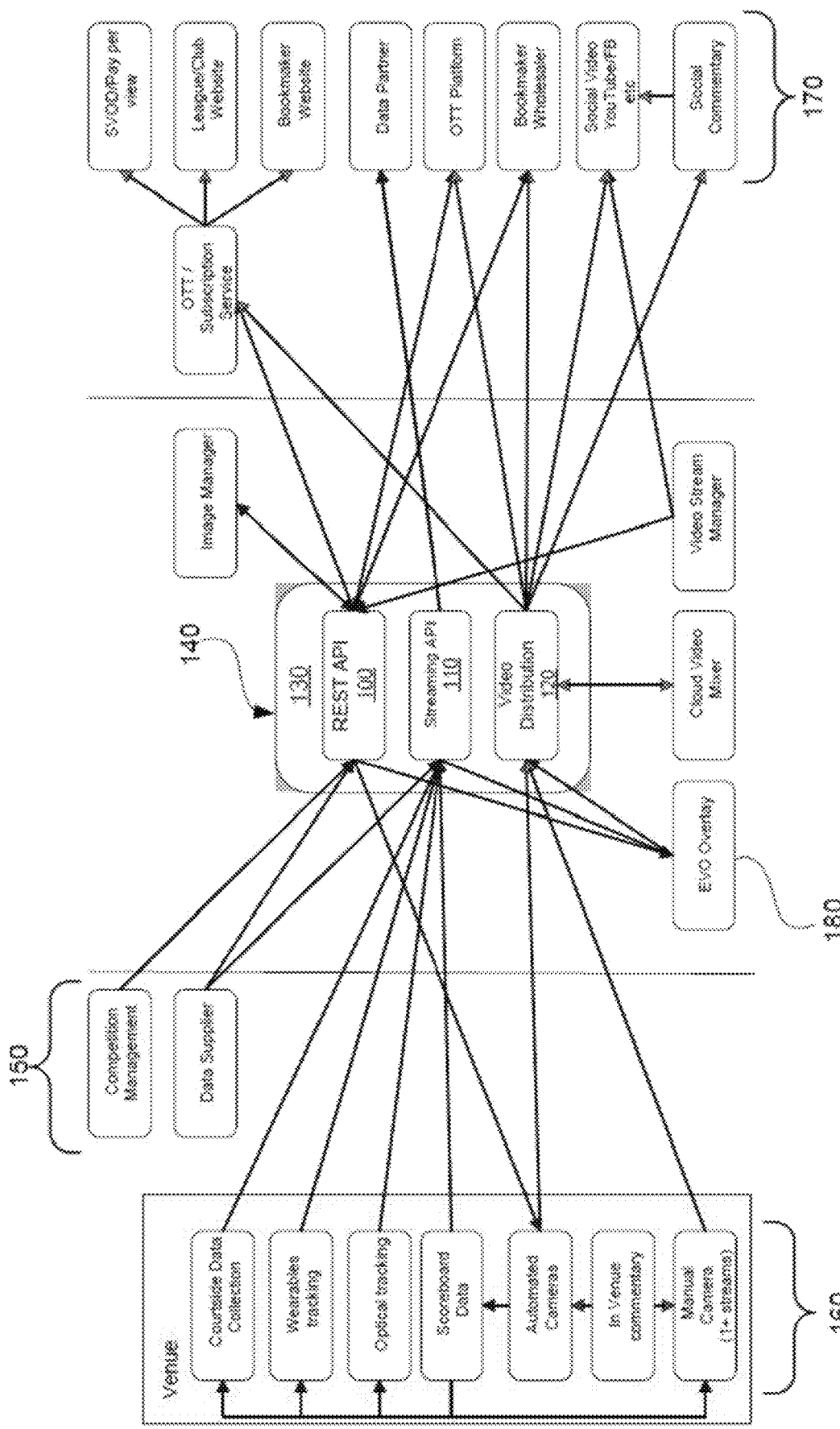
Figure 2:
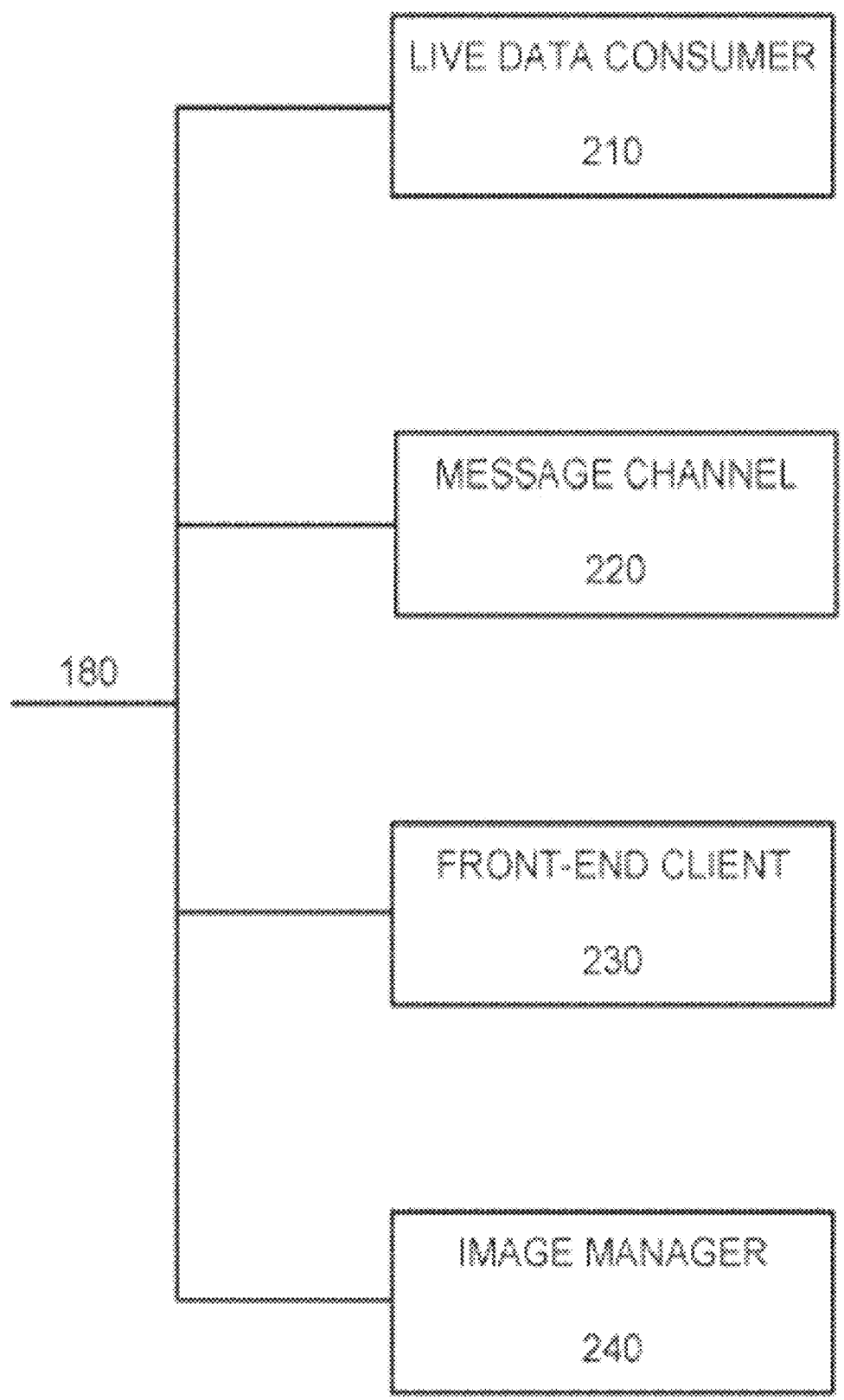

FIG. 1 is a schematic diagram illustrating an environment in which an embodiment of the invention operates; and FIG. 2 is a schematic diagram illustrating elements of and enhanced visual overlay according to an embodiment of the invention.

DETAILED DESCRIPTION

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Embodiments of the invention may be described in the general context of computer-executable instructions, such as program modules, being executed by a processing device having specialized functionality and/or by computer-readable media on which such instructions or modules can be stored. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Embodiments of the invention may include or be implemented in a variety of computer readable media. Computer readable media can be any available media that can be accessed by a computer and includes both volatile and nonvolatile media, removable and non-removable media. By way of example, and not limitation, computer readable media may comprise computer storage media and communication media. Computer storage media include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices and can be used to implement or otherwise perform practical applications.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

An embodiment provides a cloud-based product and may use API calls for reading and writing. One or more embodiments of the invention may be referred to as "DataCore" throughout this document. One or more embodiments are documented at the following links:

http://developer.atriumsports.com/datacore/
http://developer.atriumsports.com/token/
http://developer.atriumsports.com/datacore/streaming.html An embodiment may include a streaming component for accessing live details of a sporting match from a venue-based sports-content source.

An embodiment of the invention is the source of truth for sports data that allows products, partners and clients to access consistent sports information about the scheduling of sport fixtures/events, results and videos.

An embodiment may be the center of distribution of sport-based content. Regardless of the downstream company, this can sit in the center and provide the source of truth of consistent and up-to-date data.

If anyone wants the photos and schedule of a basketball league, for example, they can get it from an embodiment. If they want video clips, they get it from an embodiment.

An embodiment of the invention allows customers, and other applications, to have a single point of integration so that sport is able to benefit from multiple sports technologies without each needing unique sports data. Each simply integrate through an embodiment and this allows a single "data change" to be read by each connecting product/service. This data may involve scheduling logos, player photos, and/or video stream information.

For non-limiting example, a proprietor of an embodiment would initially speak to an event-based sports-content source, such as a league, selling them on the DataCore and its ecosystem. The league would then do a technical API integration to send their schedules/teams, etc. to DataCore. At this stage a league can then start accessing different partner technologies, such as automated cameras, that are integrated into DataCore. The longer-term goal is that a league's other technical partners can also integrate to Data-Core, to allow them to access that league's data in a consistent way, but they also then, as a partner, have a chance to sell their technology to other leagues. An integration can then be done once to DataCore and many leagues can benefit from a technical integration.

Features of an embodiment may include the following:
Control of the data flow
Setting of consistent data standards
Helping best of breed sport technology system work together to benefit sport
Aggregate data from multiple systems
Allowing approved (authenticated) users to consume the data for analyzing and display
Tracking a person from registration to participation, from being a player, a coach or a fan.
Allowing much more flexible structure around organizations and leagues
Allowing a sport to change terminology: Team/Crew/Squad; Period/Innings/Section
Allowing user (data owner) to create the UUID primary table Id, define their own "external Id" and use this to access/update the data. This can be an ID from the user's own internal system for example. They are then able to manipulate the API using these "external Ids"

The addition of flexible JSON data structures. For example, a person has extra names—allows per language a series of names (Boxscore, TV, Pronunciation, Initial, Full name, etc.). These can possibly alter per sport. Also, a "Social" structure. Twitter, Facebook etc. If the next "Great thing" comes along an embodiment can add a new enumeration and doesn't need big data table alters. Much more flexibility.

DataCore allows a change of the inputs, without the outputs being negatively affected (assuming same data). In the above example different video capture systems can be integrated and DataCore doesn't need to be aware of either, it simply treats as a trusted input.

Referring now to FIG. 1, a system 130 according to an embodiment includes a REST API 100 and a streaming API 110 implemented in one or more computing devices 140 that may be disposed in a central location or distributed across an electronic network. Such an embodiment may further include a video-distribution module 120.

In the illustrated embodiment, and as will be discussed in greater detail below herein, system 130 is in communication with what may be generally characterized as event-based sports-content sources 150 and what may be generally characterized as venue-based sports-content sources 160. System 130 serves as a center of distribution of content received or otherwise based on data from sources 150, 160 for sports-content outlet entities 170 such as, for example, streaming video/audio providers, websites and social media outlets.

Generally speaking, sources 150 are composed of organizations that, in turn, are composed of one or more constituent parts such as, for example, persons/players, sports leagues, conferences/divisions of such leagues, league competitions, clubs, playing venues, sites and teams. As such, each such organization may be configured to periodically push to system 130 data describing each such constituent part (e.g., league season schedule, team rosters, location of match, etc.) as well as changes made to each such constituent part (e.g., change in date/location of match, change in name of a player on a roster, etc.). Sources 150 can also push to system 130 statistical data characterizing matches, seasons, standings, etc., as well as images of team logos, league logos, player portraits, or any other graphical material that such constituent parts may wish to be published. System 130 is configured, in turn, to automatically (i.e., without human intervention) provide all such pushed data to entities 170 for consumption by their customers. The aforementioned constituent parts may be described in one or more embodiments as follows.

A league allows for the grouping of a number of competitions under one object. Organizations can have many leagues and one league can have many competitions. One competition may only belong to one league. However, competitions do not have to belong to any leagues.

A competition is a grouping of seasons that generally involve the same competitors. Competitions can have a history of many years, or be a once-off. The competition may be owned by the organization, but many competitions can be grouped together to form a league.

Conferences are a grouping of teams within competitions, and a division is a further grouping of teams inside a conference.

The club may be a grouping of teams. The club may share the same administrative structure over all the teams. The team may be a grouping of persons who compete together in a match. The team can compete in multiple competitions simultaneously over multiple seasons. They may exist in only one organization. The team can optionally be part of one club.

The venue is the physical location where a match occurs. Every match can have only one venue. The organization can have many venues. Sites are an optional grouping of venues.

This is generally a sporting complex that contains a number of venues. A venue can be part of 0 or 1 sites.

A person/player is a human being involved (playing in, organizing, officiating or in some other way) with the organization. A person may belong to only one organization. While logically a person could be involved over the course of their career in multiple organizations, in most cases (for the purpose of this API) they may be treated as a different person. A person belongs in teams, matches, competitions, etc. by virtue of their season rosters, fixture/match rosters or roles.

A season is a grouping of matches. Generally, the season will last a portion of a year (every year). The competition can have many seasons, but the season may only belong to one competition.

The streaming API 110 provides the entities 170 the ability to send or receive events/data in a real-time fashion using, at least partly, data received from venue-based sports-content sources 160, which may include, for example a courtside/field-side application that collects comprehensive match data, electronic devices worn by players/participants in the match, optical tracking of objects/players moving in the match, automatic and manual cameras, play-by-play commentary and scoreboard data. Whether this is, for example, statistical data, clock ticks or ball-tracking information, this API 110 is designed to support different types of data. The API 110 may be designed around the concept of a message broker and topics. The entities 170 would initially connect to the message broker and then either subscribe to one or more topics to receive information or send information to a topic (or both). Many entities 170 may be reading from or writing to the same topic simultaneously.

API 110 supports a number of different message types. Depending on the permissions of an entity 170, the entity may publish or read (or both) a particular message type. Some message types are only available to be read—they are generated automatically by system 130.

The event message type is generated when some kind of event pertaining to a match in question occurs. Whether this is a shot at goal, a referee being assigned or even just the ball moving, these can all generate messages of the "event" type. The event messages are broken down by a number of different classifier fields. In increasing levels of granularity, they are:

class—this defines the type of events this message is related to. Some examples include: sport; events relating to something that happens as part of the sporting event (e.g., a shot at goal or a foul setup, etc.); events relating to the setup of the match (e.g., assigning a player to a team/position, assigning a referee, etc.).

eventType—the type of the event (inside the class). For a sport class message this may be the type of shot being made, or for a setup class message the type of thing being assigned.

subtype—Some eventTypes (but not all) also support a 'subType' to further classify the eventType.

options—Some eventTypes/subTypes support additional options for more information about the event. These are key/pair values. While some values may be boolean (true/false) others can be integer, strings etc. While all messages of type 'event' may require a class, the other fields may or may not be required depending on the type of event.

Table 1 below is an exemplary list of fields that may be included in an event message:

TABLE 1

| Field | Description |
| --- | --- |
| eventId | A unique identifier for an event/action. UUIDv1 format. An edits/deletes of this event will need to use the same identifier. |
| entityId | A unique identifier for the entity/team that is performing this event/action. UUIDv1 format. |
| personId | A unique identifier for the person/team that is performing this event/action. UUIDv1 format. If the person is part of an entity/team that id field should also be included. |
| class | The class of the event |
| eventType | The eventType of the event |
| subType | The sub Type of the event |
| options | The options for the event |
| eventTime | An ISO-8601 datetime giving the time this event occurred. If this event is added out of sequence, then this timestamp should reflect when the event 'would' have occurred. |
| clock | The game clock time when this action occurred. Format ISO-8601 Duration. |
| shotClock | The game shot clock time when this action occurred. Format ISO-8601 Duration. |
| periodId | The unique identifier of the period. Overtime periods start at 11. 1 = 1 OT1 = 11 |
| success | Boolean. Did the action complete successfully. It most cases this is true, however goal/shot attempts can be false. |
| x | The x-coordinate on the playing surface where the action occurred. |
| y | The y-coordinate on the playing surface where the action occurred. |
| z | The z-coordinate on the playing surface where the action occurred. |
| officialId | The unique identifier of the official who made this call. |
| playId | The unique identifier of the 'play' (a group of events who share this id). |
| scores | The structure of entityIds and scores giving the current score after the completion of the action. |
| status | The status of this message. Options are added (Default); updated—meaning the content of this event has been edited; deleted—meaning this event has been deleted. |
| flagged | Boolean. This event has been flagged for further review and may be changed later |
| highlight | Boolean. This event may be a highlight of the game. |
| timestamp | An ISO-8601 datetime giving the time this message was sent. |
| clientType | The type of client that is sending this event. Generally this is given as ApplicationName: Application Version. |

The scoreboard message type contains information about the status of the official scoreboard of a match in question. The data can be generated by a physical integration to the scoreboard, OCR from a camera, computer program/App or some other means. This message may be sent at a minimum every 10 seconds, but more often if data is changing more rapidly (e.g., a clock (or shotclock) is running). This may mean the data is sent every 10th of a second, for example, if the clock supports that resolution. As scoreboard functionality varies widely, the information available in this message can also vary depending on what is available.

Table 2 below is an exemplary list of fields that may be included in a scoreboard message:

TABLE 2

| Field | Type | Description |
|---|---|---|
| status | string | The status of the connection of the sending device's connection to the scoreboard. Options are CONNECTED (actively receiving data) or DISCONNECTED (no data being received) |
| status | string | The state of the fixture/match. Options are PRE = Hasn't yet begun, RUNNING = Currently running FINAL = Finished and complete |
| periodId | integer | The unique identifier of the period. Overtime periods start at 11. 1 = 1 OT1 = 11 |
| possession Arrow | integer | If a posession arrow is in use, then this value indicates which team is next to receive possession. Options are 1 or 2. |
| clock.value | string | The current game clock time. Format ISO-8601 Duration. |
| clock.running | boolean | Whether the clock is currently running. Options are boolean true/false. |
| shotClock.value | string | The current shot clock time. Format ISO-8601 Duration. |
| shotClock.running | boolean | Whether the shot clock is currently running. Options are boolean true/false. |
| shotClock.inUse | boolean | Whether the shot clock is in use/available. Options are boolean true/false. |
| countdown | string | The value of any pre-match or period break count-down to the start/reumption of play. Format ISO-8601 Duration. |
| team1/team2 | object | These team structures hold information about specific teams. team 1 is normally the 'home' team and team2 the 'away'. |
| name | string | The name of the team |
| shortName | string | As short name/abbreviation of the team |
| score | integer | The score of the team |
| fouls | integer | The number of fouls for the team |
| timeOuts | integer | The number of time outs for the team |
| inBonus | boolean | Is this team 'in bonus?' |
| inDoubleBonus | boolean | Is this team 'in double bonus?' |
| players | object | These player structures hold information about specific players on the team. The object 'key' is a sequential number (but a 'string' key) of the player on the scoreboard (this is NOT their jersey number). |
| team.players.X.number | string | The player's jersey'/shirt number |
| team.players.X.name | string | The player's name |
| team.players.X.score | integer | The player's score |
| team.players.X.fouls | integer | The player's foul count |
| timestamp | datetime | An ISO-8601 datetime giving the time this data was generated. Decimal fractions of a second should be included if available. |
| clientType | string | The type of client that is sending this event. Generally this is given as ApplicationName:Application Version. |

The statistics message type contains information about the current statistics. These messages can relate to team or player stats for different periods (or the whole match—periodId=0). This message is sent whenever an action occurs that causes the statistics to change. The statistics for individual periods may only be sent if the statistics for that period have changed. This means that an event in period 4 will not result in the period 1 statistics being sent.

Table 3 below is an exemplary list of fields that may be included in a statistics message:

TABLE 3

| Field | Type | Description |
|---|---|---|
| X.entity | object | An object containing the statistics for the entity. |
| X.entity.Z | object | Where Z is a statistic name, given in the sport configuration. |
| X.persons | object | An object containing the unique identifiers of all the persons involved with the entitie in the fixture. |
| X.persons.Y | object | An object containing the statistics for the person Y in the entity X. |
| X.entity.Z | object | Where Z is a statistic name, given in the sport configuration. |

The play-by-play message type contains a list of events that have occurred in the current period. This message is sent whenever an event for that period occurs. This means that an event in period 4 will not result in the period 1 event list being sent.

Table 4 below is an exemplary list of fields that may be included in a play-by-play message:

TABLE 4

| Field | Type | Description |
| --- | --- | --- |
| X | array object | An array containg the events in this period. An object containing information about a specific event. See the section above and Table 1 for event for more information. |

The status message type contains information about the current status of the match and data sources. Table 5 below is an exemplary list of fields that may be included in a status message:

TABLE 5

| Field | Type | Description |
| --- | --- | --- |
| sources | object | An object showing what data sources/types are available for this fixture. |
| sources.event | string | The status of an event data source. There could be many event sources, but this will show CONNECTED if at least 1 is connected. Options are CONNECTED, NOT_CONNECTED, NOT_AVAILABLE |
| sources.scoreboard | string | The status of a scoreboard data source. There could be many event sources, but this will show CONNECTED if at least 1 is connected. Options are CONNECTED, NOT_CONNECTED, NOT_AVAILABLE |
| status.fixture | string | The status of the fixture. Options are ABANDONED, CANCELLED, CONFIRMED, DELAYED, FINISHED, INTERRUPTED, PENDING, PROTESTED, IN_PROGRESS |
| status.period | string | The status of the period. Options are PENDING, IN_PROGRESS, FINISHED, CONFIRMED |
| status.options | object | Any extra information about the fixture status. Eg. The reason for a delay if fixture = DELAYED. |
| status.periodId | integer | The current periodId |
| status.options | object | Optional object giving more information (if needed) about the fixture status |
| entities | object | An object containing information about the competitors in this match. They keys are the entityIds. |
| entities.XXXX.scores | string | The score for the particular entity |
| clock.XXXX | object | Information about the current status of the clock. This information comes from the event data. If a scoreboard feed is avaialble, this should be used instead. |
| clock.main | string | The current time on the clock. ISO 8601 Duration format. PTmmMss.ccS |
| clock.short | string | The current time on the shot clock. ISO 8601 Duration format. PTmmMss.ccS. If no shot clock is in use—then this will be null |
| clock.running | boolean | Is the clock currently running |
| timestamp | datetime | An ISO-8601 datetime giving the time this data was generated. Decimal fractions of a second should be included if available. |

The persons message type contains information about the participants in the current matches. This includes entity players as well as entity roles or match—(when entityId is blank) based roles. This message is sent whenever an action occurs that causes the information about the people to change. The messages are sent per entity. If the entity field is blank or null, this indicates this data applies to the match (not specific entities).

Table 6 below is an exemplary list of fields that may be included in a persons message:

TABLE 6

| Field | Type | Description |
| --- | --- | --- |
| entityId | string | Unique identifier for the entity that this data relates to. If this is blank or not present, it indicates this data is for the entire fixture. |
| persons | object | An object containing information about the players in the entity |
| persons.X | object | An object containing information about a specific player. |
| persons.X.name | string | The name of the person. This is just a basic name, more information can be obtained from the REST APi. |
| persons.X.position | string | The position this person plays. |
| persons.X.bib | string | The number/position on this player's bib/shirt |
| persons.X.active | boolean | Whether this person is currently on the field of play |

TABLE 6-continued

| Field | Type | Description |
|---|---|---|
| persons.X.starter | boolean | Whether this person was on the field of play at the start of the fixture. |
| persons.X.unregistered | boolean | Is this person un-registered? |
| roles | object | An object containing information about the roles in the entity |
| roles.X | object | An object containing information about a specific role. |
| roles.X.name | string | The name of the person. This is just a basic name, more information can be obtained from the REST API. |
| roles.X.bib | string | The number/position on this person's bib/shirt |
| roles.X.number | integer | The official's number, e.g., 2nd referee |

An embodiment provides an automated graphics enhanced video overlay (EVO) 180 for sports video production. It can be employed in connection with any sporting organisation, federation, league, club, etc. that is broadcasting live sporting matches/events. As such, an embodiment is able to enhance the production by adding automated, intelligence-based, on-screen graphical overlays 180 that enhance the viewer engagement by providing basic information such as, for example, clock and scores, as well as detailed team and player statistics at appropriate times throughout the match/event using data provided by system 130. It includes the ability to include logos and player photos as well as sponsor/commercial imagery. As an automated service, no human involvement is required during the match for an embodiment to function.

An embodiment provides a software/technology product that uses available sports statistical data to generate graphic elements that can be displayed as an overlay on a video broadcast. An embodiment takes a live feed of match/game data and overlays a graphical layer onto a broadcast/video. An embodiment runs off the data within system 130, so the schedules, teams, photos, logos, etc. are integrated to system 130 from the league(s) and then as an embodiment reads a schedule, it automatically picks up all the assets (logos, player photos, etc.) and uses them to generate the rich content (e.g., Player X hits a three-pointer)—this would, prompted by coded triggers that are guided by predetermined business rules, display a small boxscore, player scoring leaders, a player photo of who made the shot, scored the goal, hit the home run, scored a touchdown, etc. and/or any of the data describing statistics, personnel and/or events described in the Tables above herein. As such, each match event governs activation of the coded triggers that in turn invoke in the overlay 180 a corresponding graphic providing information characterizing one or more aspects, as listed in the Tables above herein, of such event. In an embodiment, a special encoded URL is placed into a graphical overlay function of the video distributor software and automatically just "runs" that URL over the video Referring to FIG. 2, an embodiment of the EVO 180 includes a number of components:

Live Data Consumer 210—running as a cloud-based service, the Live Data Consumer connects to available statistical data sources and consolidates into a series of triggers and information blocks that are sent to the message channel for action by the front end of an embodiment.

Message Channel 220—a live-stream message queue that is published to by the Live Data Consumer and subscribed to by the Front-End Client.

Front End Client 230—Based on information sent by the Live Data Consumer, the Front-End Client generates a number of different zones that are displayed based on intelligent business rules. This is the component that is overlaid onto the video.

Image Manager 240—The customer manages all of their own logos, player photos and commercial/sponsor imagery within Image Manager. Images are uploaded and when available, displayed within zones in the Front-End Client.

By being cloud-based, there is no need for people or hardware/software at the venue, which means that costs, training and general overheads are removed. This further means that organizations that would not have been able to have graphical overlays are now able to do so and provide an improved experience for the viewer.

Automation of the service means that things start and stop as required without any human intervention from an embodiment or the customer.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims.

What is claimed is:

1. A system, comprising:

one or more computing devices communicatively coupled to one or more sports content sources, the one or more computing devices further coupled to multiple sports-content outlet entities;

a first application program interface (API) implemented by the one or more computing devices, the first API configured to receive from the one or more event-based sports content sources event-based sports content and automatically push the event-based sports content to the outlet entities, wherein the event-based sports content comprises information describing at least one characteristic of an athletic team competing in a match on at least one of an athletics court and athletics field; and a second API implemented by the one or more computing devices, the second API configured to receive from the one or more venue-based sports content sources streaming venue-based sports content and automatically push the streaming venue-based sports content to the outlet entities, wherein the venue-based sports content comprises data generated by electronic devices worn by members of the athletic team participating in the match on the court or field, data generated from optical tracking of each individual member of the athletic team moving in the match on the court or field and data generated by automatic cameras capturing images of each individual member of the athletic team moving in the match on the court or field, the one or more event-based sports content sources being exclusive of the one or more venue-based sports content sources, and the event-based content is in a first format different from a second format of the venue-based content, the first API further configured to provide overlay content overlaid on the streaming venue-based sports content in a plurality of zones.

2. The system of claim 1, wherein the first API comprises a representational state transfer API.

3. The system of claim 1, wherein the second API comprises a streaming API.

4. The system of claim 1, wherein the event-based sports content comprises a league season schedule.

5. The system of claim 1, wherein the event-based sports content comprises a team roster.

6. The system of claim 1, wherein the event-based sports content comprises a logo of the athletic team.

7. The system of claim 1, wherein the venue-based sports content comprises play-by-play commentary.

8. A method, comprising:
  employing one or more computing devices communicatively coupled to one or more sports content sources, the one or more computing devices further coupled to multiple sports-content outlet entities;
  employing a first application program interface (API) implemented by the one or more computing devices, the first API configured to receive from the one or more event-based sports content sources event-based sports content and automatically push the event-based sports content to the outlet entities, wherein the event-based sports content comprises information describing at least one characteristic of an athletic team competing in a match on at least one of an athletics court and athletics field; and
  employing a second API implemented by the one or more computing devices, the second API configured to receive from the one or more venue-based sports content sources streaming venue-based sports content and automatically push the streaming venue-based sports content to the outlet entities, wherein the venue-based sports content comprises data generated by electronic devices worn by members of the athletic team participating in the match on the court or field, data generated from optical tracking of each individual member of the athletic team moving in the match on the court or field and data generated by automatic cameras capturing images of each individual member of the athletic team moving in the match on the court or field, the one or more event-based sports content sources being exclusive of the one or more venue-based sports content sources, and the event-based content is in a first format different from a second format of the venue-based content, the first API further configured to provide overlay content overlaid on the streaming venue-based sports content in a plurality of zones.

9. The method of claim 8, wherein the first API comprises a representational state transfer API.

10. The method of claim 8, wherein the second API comprises a streaming API.

11. The method of claim 8, wherein the event-based sports content comprises a league season schedule.

12. The method of claim 8, wherein the event-based sports content comprises a team roster.

13. The method of claim 8, wherein the event-based sports content comprises a logo of the athletic team.

14. The method of claim 8, wherein the venue-based sports content comprises play-by-play commentary.

* * * * *